(12) United States Patent
Beal (10) Patent No.: US 11,965,723 B2
(45) Date of Patent: Apr. 23, 2024

(54) POLYMER JACKETED POWDER CORE PROJECTILE

(71) Applicant: True Velocity IP Holdings, LLC, Garland, TX (US)

(72) Inventor: Harold F. Beal, Rockford, TN (US)

(73) Assignee: True Velocity IP Holdings, LLC, Garland, TX (US)

( * ) Notice: Subject to any disclaimer, the term of this patent is extended or adjusted under 35 U.S.C. 154(b) by 74 days.

(21) Appl. No.: 17/883,559

(22) Filed: Aug. 8, 2022

(65) Prior Publication Data

US 2023/0039980 A1 Feb. 9, 2023

Related U.S. Application Data

(60) Provisional application No. 63/230,682, filed on Aug. 6, 2021.

(51) Int. Cl.
| | |
|---|---|
| *F42B 5/02* | (2006.01) |
| *B22F 3/22* | (2006.01) |
| *F42B 12/74* | (2006.01) |
| *F42B 12/78* | (2006.01) |
| *F42B 12/82* | (2006.01) |
| *B29C 70/72* | (2006.01) |
| *B29K 705/08* | (2006.01) |
| *B29L 31/00* | (2006.01) |

(52) U.S. Cl.
CPC ............. *F42B 12/78* (2013.01); *B22F 3/225* (2013.01); *F42B 5/025* (2013.01); *F42B 12/74* (2013.01); *F42B 12/82* (2013.01); *B29C 70/72* (2013.01); *B29K 2705/08* (2013.01); *B29L 2031/777* (2013.01)

(58) Field of Classification Search
CPC .......... F42B 5/025; F42B 12/74; F42B 12/76; F42B 12/78; F42B 12/80; F42B 12/82; F42B 33/00; F42B 33/001; F42B 5/02
USPC ................................ 102/501, 514, 515, 516
See application file for complete search history.

(56) References Cited

U.S. PATENT DOCUMENTS

| | | | |
|---|---|---|---|
| 627,929 A | 6/1899 | Andrews et al. | |
| 3,132,591 A | 5/1964 | Reinhold et al. | |
| 3,485,173 A | 12/1969 | Morgan | |
| 3,866,536 A | 2/1975 | Greenberg | |
| 3,897,732 A * | 8/1975 | Atkins ................... | F42B 10/42 102/515 |

(Continued)

FOREIGN PATENT DOCUMENTS

| | | |
|---|---|---|
| DE | 3840165 A1 | 7/1990 |
| DE | 10045009 A1 | 5/2001 |

(Continued)

*Primary Examiner* — James S Bergin
(74) *Attorney, Agent, or Firm* — Burdick Patents, P.A.; Sean D. Burdick; Colin L. Honan (57) ABSTRACT

A method is disclosed for coating a projectile for use in an ammunition cartridge. A polymer jacket is applied to an undersized projectile core of a first standard caliber to bring the outer dimensions of the jacketed projectile into compliance with those of a second, larger caliber projectile. The polymer jacket coating may produce a non-uniform outer diameter of the polymer jacketed projectile and may include a plurality of circular cavities defined therein. The polymer-jacketed projectile may be a bullet for pistol or rifle ammunition, or a pellet, or shot for use in a shotgun shell.

20 Claims, 5 Drawing Sheets

(56) References Cited

U.S. PATENT DOCUMENTS

| | | | |
|---|---|---|---|
| 4,128,060 A | 12/1978 | Gawlick et al. | |
| 4,328,750 A * | 5/1982 | Oberg | C08K 3/30 |
| | | | 427/195 |
| 5,200,573 A * | 4/1993 | Blood | F42B 7/046 |
| | | | 102/501 |
| 5,275,110 A | 1/1994 | Flatau | |
| 5,950,063 A | 9/1999 | Hens et al. | |
| 6,048,379 A | 4/2000 | Bray et al. | |
| 6,070,532 A | 6/2000 | Halverson | |
| 6,257,149 B1 | 7/2001 | Cesaroni | |
| 6,457,417 B1 | 10/2002 | Beal | |
| 6,551,376 B1 | 4/2003 | Beal | |
| 6,607,692 B2 | 8/2003 | Beal | |
| 6,649,095 B2 | 11/2003 | Buja | |
| 6,935,217 B2 | 8/2005 | Beal | |
| 7,000,547 B2 | 2/2006 | Amick | |
| 7,069,834 B2 | 7/2006 | Beal | |
| 7,204,191 B2 | 4/2007 | Wiley et al. | |
| 7,232,473 B2 | 6/2007 | Elliott | |
| 7,243,588 B2 | 7/2007 | Beal | |
| 7,383,776 B2 | 6/2008 | Amick | |
| 7,585,166 B2 | 9/2009 | Buja | |
| 7,597,037 B2 | 10/2009 | Beal | |
| 7,750,091 B2 | 7/2010 | Maljkovic et al. | |
| 8,881,654 B2 | 11/2014 | Seecamp | |
| 10,081,057 B2 * | 9/2018 | Burrow | B22F 3/10 |
| 10,883,786 B2 * | 1/2021 | Reilly | F41A 9/38 |
| 11,268,791 B1 | 3/2022 | Frees et al. | |
| 11,313,654 B2 * | 4/2022 | Burrow | F42B 5/307 |
| 11,828,555 B2 * | 11/2023 | Reilly | F41A 21/16 |
| 2002/0056397 A1 | 5/2002 | Carr et al. | |
| 2002/0084543 A1 | 7/2002 | Buja | |
| 2003/0101891 A1 * | 6/2003 | Amick | F42B 12/34 |
| | | | 102/514 |
| 2005/0005807 A1 | 1/2005 | Wiley et al. | |
| 2006/0005731 A1 * | 1/2006 | Muth | F42B 10/46 |
| | | | 102/501 |
| 2006/0027129 A1 | 2/2006 | Kolb et al. | |
| 2008/0196616 A1 | 8/2008 | Cziglenyi | |
| 2009/0042057 A1 | 2/2009 | Thomas et al. | |
| 2013/0092041 A1 | 4/2013 | Seecamp | |
| 2016/0131463 A1 * | 5/2016 | Stauffer | F42B 8/12 |
| | | | 102/515 |
| 2016/0377397 A1 * | 12/2016 | Winge | F42B 33/00 |
| | | | 86/19.5 |
| 2018/0313639 A1 | 11/2018 | Peterson | |
| 2019/0277610 A1 | 9/2019 | Eberhart | |
| 2021/0341276 A1 | 11/2021 | Jones | |

FOREIGN PATENT DOCUMENTS

| | | |
|---|---|---|
| EP | 2498046 A1 | 9/2012 |
| GB | 2602050 A | 6/2022 |
| WO | 2009111654 A1 | 9/2009 |
| WO | 2018218292 A1 | 12/2018 |

* cited by examiner

POLYMER JACKETED POWDER CORE PROJECTILE

RELATED APPLICATIONS

This application claims priority to U.S. Provisional Application 63/230,682, filed on Aug. 6, 2021, and which is fully incorporated herein by reference.

BACKGROUND OF THE INVENTION

Field of the Invention

The present invention relates generally to ammunition for firearms, and more specifically to methods of constructing ammunition by coating an undersized projectile.

Description of Related Art

Coating or jacketing projectiles such as lead bullets for firearms is well known in the art of making ammunition. Full metal jacketing (FMJ) stabilizes the shape of lead bullets and reduces misfeeding when chambering rounds. FMJ also allows for higher muzzle velocities and reduces the metal deposition in the bore of the firearm. Total metal jacketing (TMJ) consists of electroplating a thin layer of metal, usually copper, over the entire surface of a bullet made from softer metal such as lead. Generally, TMJ improves projectile accuracy and prevents the release of molten lead from the muzzle of the firearm.

Processes such as FMJ and TMJ can undesirably add weight to the projectile, which limits velocity of the projectile and also reduces accuracy at long range. What is needed is a method for coating a projectile that achieves the advantages of FMJ and TMJ without adding excessive weight that adversely affects projectile ballistics.

SUMMARY OF THE INVENTION

The invention herein relates to a polymer-jacketed projectile and methods of manufacturing the polymer-jacketed projectile. In accordance with one embodiment of the invention, an undersized core with dimensions equivalent to a first caliber projectile is provided. Preferably, the undersized core is formed from one or more metal powders through a metal injection molding process. The undersized core has a jacket applied to the outer surface thereof to bring the dimensions of the projectile up to those of a second caliber projectile. The jacket is preferably made from one or more polymer compositions through injection molding. The dimensions of the second caliber are larger than the dimensions of the first caliber. For example, the undersized core may have dimensions equivalent to a 7 mm projectile which are then brought up to the standard dimensions of a .308 caliber projectile by application of the jacket.

In some embodiments, the jacket has a nonuniform outer surface with a plurality of dimples formed therein. The dimples may be of any desired shape but are preferably semi-circular, hexagonal, or pentagonal in shape. The number and depth of the dimples may be selected to achieve specific desired ballistic characteristics in conjunction with a specific desired use for the projectile.

The polymer-jacketed projectile may be formed to meet the specifications of any standard bullet or other standardized projectile shape. For instance, the jacketed projectile may be formed for rifle ammunition having a defined ogive and boat tail or may be formed with a flat base for pistol ammunition. Alternatively, the inventive concepts can also be applied to pellets or to shot used in shotgun ammunition. Similarly, the jacket may be molded to form a hollow point projectile or a rounded or pointed tip projectile.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

DETAILED DESCRIPTION OF THE INVENTION

The following disclosure presents exemplary embodiments of a polymer jacketed projectile. In specific embodiments disclosed, the jacketed projectile has a core molded from metallic powders. The jacketed projectiles disclosed herein are suitable for the construction of a projectile fired from a pistol, rifle, or shotgun of military or civilian grade. Also disclosed are methods for manufacturing the disclosed jacketed projectile.

In one embodiment, a process according to the invention for manufacturing a coated projectile requires the provision of an undersized projectile that will become a finished projectile when the process is completed. Herein, "undersized" means that the undersized projectile is not sufficiently dimensionally large enough in any of length, width, diameter, or caliber to satisfy the specifications (e.g. MIL spec or otherwise) that the finished projectile must meet to ensure proper fit within and discharge from a firearm into which the finished projectile is to be loaded. The undersized projectile may be preformed using metallic or synthetic materials. For example, the undersized projectile may be formed from solid metal, or from powdered metal either singular or blended from two or more metal powders, or from one or more metal powders that are wetted with another metal or synthetic polymer. Furthermore, the undersized core and final jacketed projectile may be described as having "standard dimensions" for the particular caliber of projectile. The skilled artisan will readily recognize and understand what the "standard dimensions" are for any given caliber of projectile as these dimensions are well known and must be tightly controlled for proper firing.

Throughout this disclosure, the terms "polymer" and "synthetic polymer" and "synthetic coating" shall be interpreted in a non-limiting fashion and given a broad interpretation according to their plain and ordinary meaning. "Polymer" can mean a natural polymer or a synthetic polymer, and any invention described herein that refers to a "synthetic polymer" may, in an alternative embodiment, substitute a natural polymer for the synthetic polymer and vice versa. Examples of polymers as used herein include but are not limited to acrylic, polyethylene, polyolefin, polypropylene, polystyrene, polyvinylchloride, synthetic rubber, phenol formaldehyde, neoprene, nylon, polyacrylonitrile, PVB, silicone, and any of the foregoing in powdered, micronized powdered, or resin form.

The undersized preformed projectile, being undersized, allows tolerance for a heated synthetic polymer coating to be applied thereto, to build up the outer surface of the undersized projectile until it achieves a specified size or caliber that allows proper engagement of the projectile within the barrel of a firearm or other weapon. In one embodiment, the polymer or synthetic coating is applied in a uniform manner over the entire surface of the undersized projectile, and can be so applied as to allow for either a hollow point ogive or a covered ogive. In one embodiment, the polymer coating can be applied with heat in a fluid or mist process.

The polymer jacketed projectile has several advantages over prior art jacketed projectiles. One such advantage is found in that polymer does not generate the same levels of kinetic heat as that of more traditional copper jackets. Thus, the polymer jacketed projectile has less heat transferred to the barrel of the weapons system which can prolong the life of the barrel and reduce maintenance requirements. Further, polymer is less expensive than the metals traditionally used for jacketing projectiles and therefore can reduce manufacturing costs. A third advantage is found in weight savings regarding the projectile weight. In general, a polymer jacketed projectile according to the present invention weighs less than a metal jacketed projectile of the same caliber. The overall reduction in weight results in improved ballistic performance of the projectile. As will become apparent to the skilled artisan, jacketing a projectile in a polymer jacket has numerous other advantages over the prior art beyond those described herein.

Figure 1:
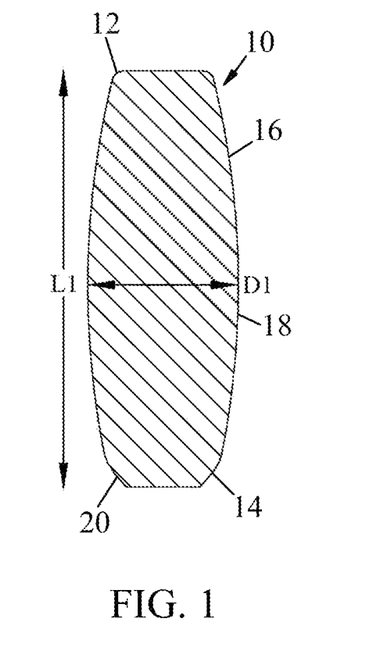
FIG. 1 is a cross-sectional view of an embodiment of an undersized core of the present invention.

FIG. 1 is a cross-sectional view of a first embodiment of an undersized core 10. The undersized core 10 has a first end 12 defining the tip-end and an opposite second end 14 defining the base-end. The length between the first end 12 and second end 14 is defined as L1. The first end 12 has a defined ogive region 16 extending into a body section 18 which defines a first diameter D1. The body section 18 extends toward the second end 14. In some embodiments, like the one illustrated, the second end tapers inwards to define a boat tail 20.

Figure 2:
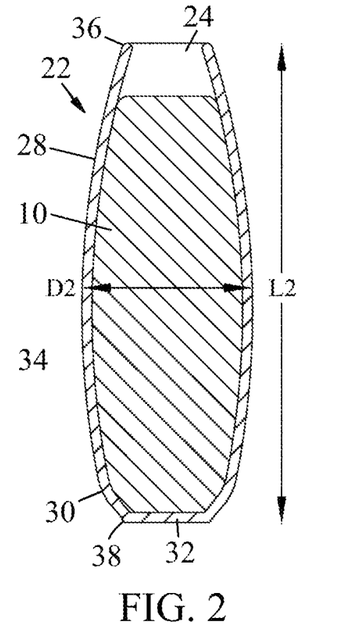
FIG. 2 is a cross-sectional view of an embodiment of the undersized core coated with a first embodiment of a polymer jacket to form a hollow-point bullet.
Figure 3:
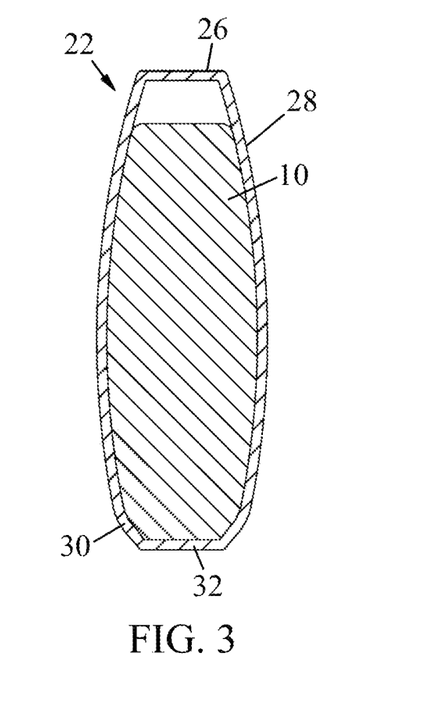
FIG. 3 is a cross-sectional view of an embodiment of the undersized core coated with an embodiment of the polymer jacket to form a conventional standard-sized bullet.

FIG. 2 is a cross-sectional view of the undersized core 10 encased within a first embodiment of a polymer jacket 22. FIG. 2 illustrates the polymer jacket 22 forming a hollow point 24. FIG. 3 illustrates the polymer jacket 22 forming a complete jacket which can be a flat or rounded tip 26. Regardless of the final form of the bullet tip, the polymer jacket 22 is coated onto the undersized core. The polymer jacket 22 has an outer ogive region 28 that corresponds substantially to the ogive region 16 of the undersized core 10. The outer ogive region 28 of the polymer jacket 22 extends over the body 18 of the undersized core to form an outer body 34. The outer body 34 corresponds to, and substantially coats, the undersized core body section 18. The outer body 34 extends to an outer boat tail 30 that corresponds to, and substantially coats, the boat tail 20 of the undersized core 10. The polymer jacket further includes an outer base 32 that corresponds to, and substantially coats, a base of the undersized core. The polymer jacket 22 has an outer length L2 defined between a tip-end 36 and a base-end 38. The outer length L2 is greater than the length L1 of the undersized core. Similarly, an outer diameter D2 defined through the outer body 34 is greater than the diameter D1 of the undersized core.

The undersized core 10 may correspond to a first caliber bullet, for example a 7 mm bullet. The length L1 and diameter D1 of the undersized core are formed according to the standard dimensions for the first caliber. In the example provided, the diameter D1 and length L1 correspond to the standard diameter and length for a 7 mm bullet. The polymer jacket 22 is then coated onto the undersized core sufficiently to increase the dimensions of the first caliber bullet to a second, larger caliber bullet. In the provided example, the 7 mm bullet representing the undersized core 10 can be coated with the polymer jacket in sufficient quantity to bring the outer length L2 and outer diameter D2 up to the standard dimensions of a .308 caliber bullet.

Figure 4:
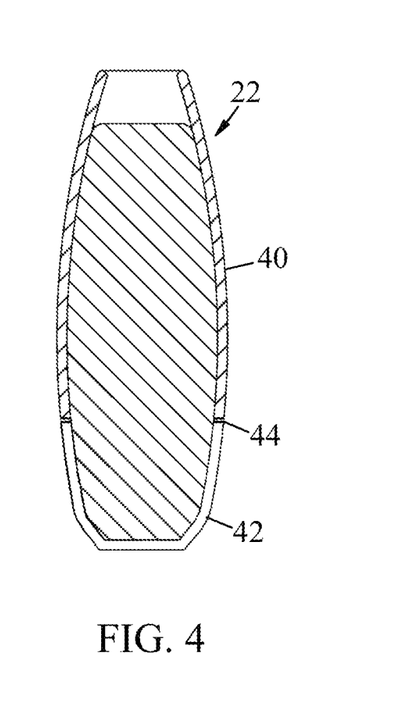
FIG. 4 is a cross-sectional view of an embodiment of the undersized core coated in an embodiment of a two-piece polymer jacket.

FIG. 4 illustrates another embodiment according to the invention having a two-piece polymer jacket. The polymer jacket 22 has an upper jacket 40 that is connected to a lower jacket 42 at a jacket joint 44. The jacket joint 44 may be formed circumferentially on the outer surface of the polymer jacket 22 at any longitudinal position that corresponds to a point along the length L2. In the illustrated embodiment, the jacket joint 44 is formed on a lower one-third of the jacket, below the diameter D2. In other embodiments, the jacket joint 44 may be positioned within or adjacent to a border of the boat tail region near the base, or within or adjacent to a border of the ogive region closer to the tip.

The invention described thus far has been in reference to a polymer jacketed boat tail bullet. However, it is to be understood that the disclosed inventive concepts can be applied equally to all types of bullets, including a traditional flat base bullet. Similarly, the polymer jacket can form a hollow point or traditional round or pointed nose bullet. Further, the inventive concepts can also be applied to projectiles for other types of ammunition, including shotgun or artillery ammunition.

Figure 5:
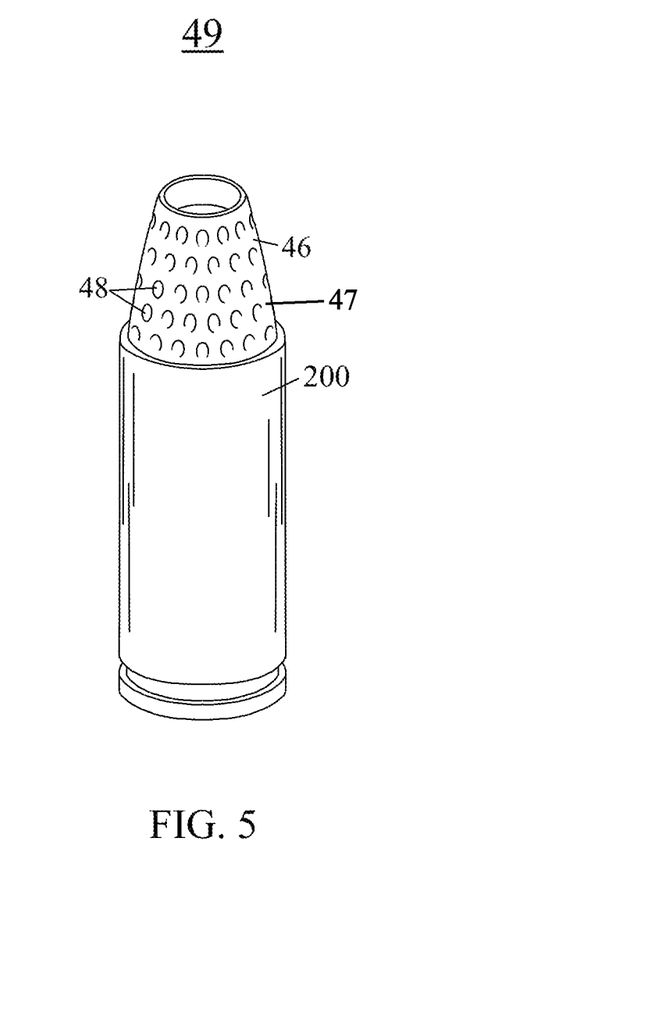
FIG. 5 is a perspective view of an embodiment of a dimpled polymer jacketed bullet loaded in an ammunition cartridge.

FIG. 5 is a perspective view of one embodiment of an ammunition cartridge 49 according to the present invention, which consists of a polymer jacketed bullet 46 loaded into a cartridge casing 100. Cartridge 49 has the above-described general features with the added benefit of the polymer jacket having a nonuniformed outer surface 47. The nonuniformed outer surface 47 may be formed by molding a plurality of semi-circular recesses or dimples 48 into the surface of the polymer jacket. The dimples 48 in the outer surface 47 are designed to create small pockets of turbulence around the projectile as it moves through the air. This will reduce the drag the bullet experiences, resulting in increased performance. As illustrated, the casing 100 is a conventional straight walled cartridge. It should be understood, however, that the present invention is capable of being used in all types of cartridges, including bottleneck and shotgun cartridges as well as other types of artillery casings.

Figure 6:
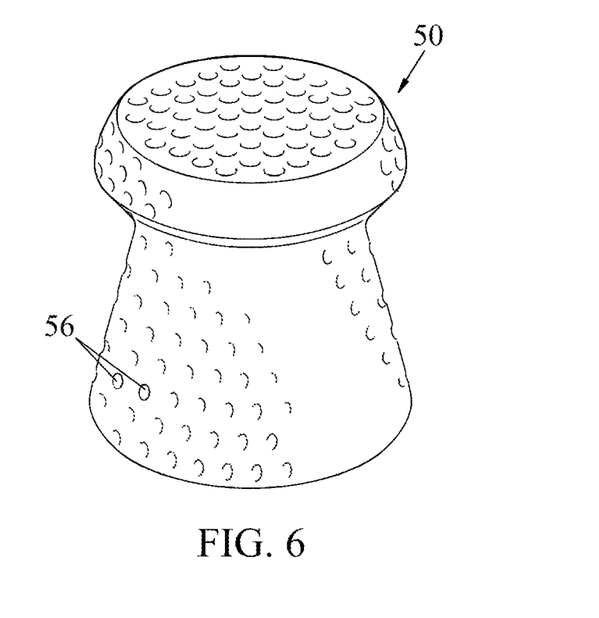
FIG. 6 is a perspective view of an embodiment of a dimpled polymer jacketed pellet projectile.
Figure 7:
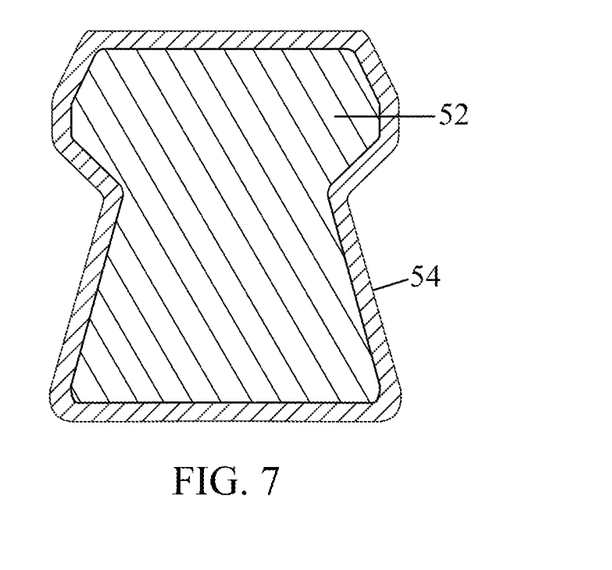
FIG. 7 is a cross-sectional view of an embodiment of an undersized pellet core coated with a polymer jacket.
Figure 8:
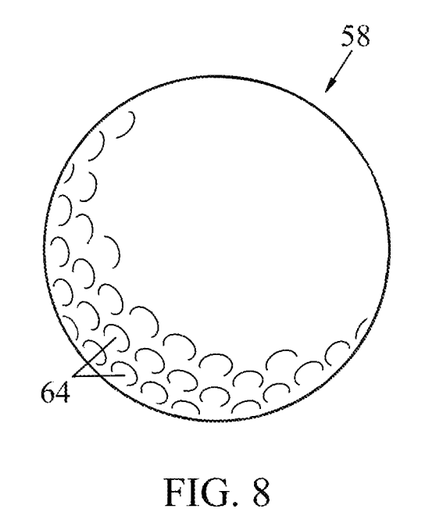
FIG. 8 is a front view of an embodiment of a dimpled polymer jacketed ball projectile.
Figure 9:
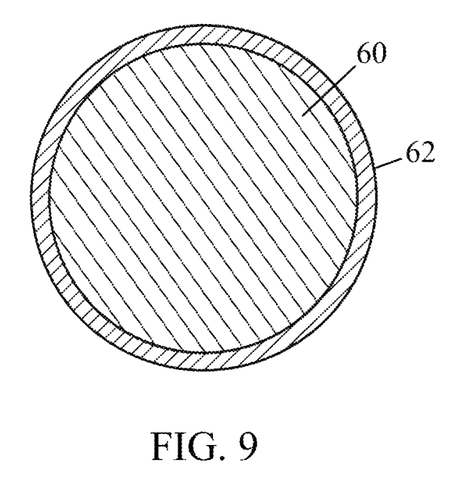
FIG. 9 is a cross-sectional view of an embodiment of an undersized ball projectile coated with a polymer jacket.

FIGS. 6-9 illustrate varying views of the foregoing inventive concepts as applied to a pellet (FIG. 6-7), or to shot (FIG. 8-9) that is commonly used as the projectile for shotgun shells. FIGS. 6-7 illustrate a polymer jacketed pellet 50. The jacketed pellet 50 has an undersized pellet core 52 that is molded with a polymer jacket 54. The polymer jacket 54 brings the undersized pellet core 52 up to the final desired dimensions. In some embodiments, the polymer jacket 54 includes a plurality of dimples 56 defined throughout the outer surface of the jacket. In alternative embodiments, the polymer jacket 54 can form a smooth outer surface on the pellet, as is partially illustrated in FIG. 6. FIGS. 8-9 illustrate a polymer jacketed shot 58. The jacketed shot 58 has an undersized shot core 60 that is molded with a polymer jacket 62 which brings the shot to the final desired dimensions. In some embodiments, the polymer jacket 62 has a plurality of dimples 64 defined throughout the outer surface thereof while in other embodiments the polymer jacket 62 may form a smooth outer surface. For shot or shotgun pellets that are formed with powder metallurgical processes, a synthetic coating process according to the present invention will allow for a more stable and extended flight after discharge.

Figure 10:
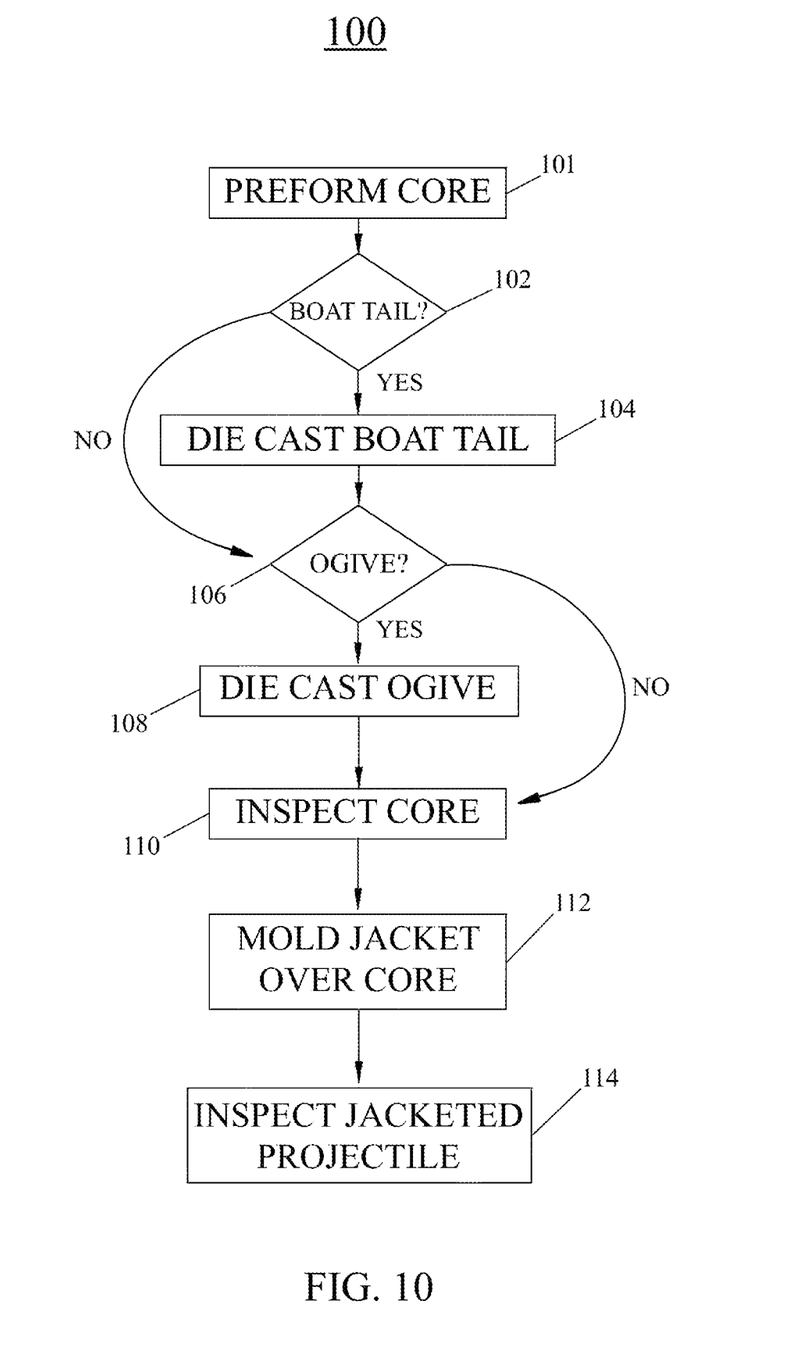
FIG. 10 is a block diagram showing an embodiment of the salient steps for a method of manufacturing the polymer jacketed projectile of the present invention.

In general, a method 100 for forming the polymer jacketed bullet is herein described and diagramed in FIG. 10. At step 101, the undersized core is preformed. Preferably, the undersized core is preformed from one or more powdered metals. In one example, a high density tungsten metal powder is used but any metallic powder is acceptable. Preferably, the metal powder chosen or combination of metal powders chosen have a density greater than lead but in some cases it may be desirable for the metal powders to have a density less than lead. In some cases, it may be necessary to add a filler material to control the density of the undersized core. The filler material may be of any kind conventionally used in metal injection molding, such as tin, zinc or aluminum. The specific metal powder and filler material may be selected to control the desired characteristics of the undersized core, such as density, weight and frangibility of the projectile upon impact. Preferably, but not necessarily, the undersized core is molded to the standard dimensions of a first caliber bullet. The caliber of bullet chosen to mold the undersized core must be less than the final desired caliber of the polymer jacketed projectile.

After the undersized core has been preformed, at step 102 it must be determined whether the final jacketed projectile requires a boat tail configuration. If a boat tail is required, the process advances to step 104 wherein a die cast is used to mold the boat tail on the undersized core. If a boat tail is not required or after step 104, the process advances to step 106. At step 106, it is determined whether the final jacketed projectile requires an ogive configuration. If an ogive is required, the process advances to step 108. At step 108 a second die cast is used to mold the ogive region opposite the boat tail. If an ogive region is not required in the final projectile or after the ogive has been molded at step 108, the process advances to step 110. At step 110, the preformed undersized core is inspected for quality and to ensure the dimensions are within acceptable tolerances for the first caliber projectile chosen. Undersized cores that fail the inspection process will be discarded and the molded cores may be crushed up so that the powders may be recycled.

The first and second dies are dimensioned according to the standard dimensions for the first caliber projectile chosen to form the undersized core. The steps utilizing the first and second die have been described in sequence but the skilled artisan will understand that these can accomplished in parallel or in some cases one or more of the steps may be performed simultaneously. The final molded undersized core will have the standard dimensions for the chosen first caliber projectile.

If the molded undersized core passes the inspection step 110, the process advances to step 112. At step 112, the jacket, preferably made from one or more polymers, is injection molded over the undersized core. Molding of the polymer jacket may be accomplished according to known injection molding processes. The injection molding process may utilize heat in a fluid or mist application or any other conventional and well-known injection molding process. In one such process, the polymer jacket is molded in a uniform manner over the entire surface of the undersized core. In this embodiment, the final polymer jacketed projectile will have a uniform outer surface. In some embodiments, the polymer jacket may be molded in two separate parts by molding a lower jacket and an upper jacket. The lower jacket and upper jacket may be joined at a jacket joint defined circumferentially on the outer surface of the polymer jacket 22 at any longitudinal position that corresponds to a point along the length L2. The joining of the upper and lower jackets may be accomplished in accordance with well-known and conventional means for joining two pieces together at a joint. For example, an adhesive may be used to hold the jackets together.

In some embodiments, the polymer jacket mold has a plurality of small semi-circular protrusions defined in the walls of the mold. The protrusions in the jacket mold form corresponding dimples in the finally molded polymer jacket. The number and dimension of the resulting dimples can be chosen so as to optimize the polymer jacket bullet for the type ammunition and ballistic performance desired. Similarly, the protrusions may be formed in shapes other than semi-circular, such as hexagonal or polygonal.

After the molding step 112 is complete, the projectile passes another inspection step 114. The final inspection step ensures the final dimensions of the projectile have been sufficiently increased to the standard dimensions of the second caliber projectile. If the final dimensions of the polymer jacketed projectile are within the acceptable tolerance ranges for the second caliber projectile, the molded projectile can be passed on for loading into a casing. Molded projectiles that fail the final inspection step are discarded and the materials used can be crushed up for recycling.

The molding of the polymer jacket over the undersized core results in the final jacketed bullet having an outer diameter D2 and an outer length L2. The outer diameter D2 and outer length L2 correspond to a second caliber bullet which is larger than the first caliber bullet. Thus, the polymer jacket must be molded with a sufficient thickness to bring the undersized core up to the dimensions of the final standard dimensions for the caliber of bullet chosen. In the example described above, this requires application of a sufficient quantity of polymer to a 7 mm bullet to bring the overall dimensions into compliance with the standard dimensions for a .308 caliber bullet.

A process according to the invention would allow for a finished projectile to be lighter in overall weight than an identically-sized FMJ or TMJ projectile, by substitution of a lighter and lower synthetic density jacket material. For example, a conventional 100 grain bullet of .224 caliber has a jacket that weighs 25 grains by weight. In contrast, by substituting according to the invention a synthetic material for the copper jacket the weight of the jacket covering is reduced by approximately 80%. The invention would thus reduce the weight of the 100 grain bullet to only 80 grains. Reduction of bullet weight (in this example a reduction of 20% allows the projectile when fired to attain a higher velocity and flatter trajectory, and therefore improve the terminal ballistics. The ballistics may be especially improved for an undersized powder formed bullet coated according to any of the methods disclosed herein.

In another embodiment of the invention, a finished projectile is formed starting from an undersized projectile of similar shape as the finished projectile but having smaller outer dimensions with respect to the finished projectile. The undersized projectile is formed by sintering, then the sintered undersized projectile is built up to finished projectile specifications by coating the outer surface of the undersized projectile using a polymer or synthetic coating to serve as, or form, a jacket. The coating may be achieved using methods presented above.

A synthetic or polymer coated bullet made according to the invention may have a diameter that may vary from about 0.50 mm to about 158.00 mm, with a corresponding coating on said variance from about 0.05 mm to about 157.50 mm. Thus, projectiles such as 155 mm artillery rounds are included within the scope of products made by a process according to the invention.

Projectiles manufactured according to the processes disclosed herein will have lighter projectile mass, as compared to projectiles coated using conventional methods such as FMJ and TMJ. This means that a projectile made according to the present invention may advantageously carry more payload than a conventional projectile and achieve superior performance. For example, a projectile of the present invention could pack additional fuel (e.g. gunpowder) to achieve longer range, or could pack additional explosive charge in the war head to deliver greater damage.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A polymer jacketed projectile, comprising:
   an undersized core having a first diameter and a first length, wherein the first diameter is equal to a standard diameter for a first caliber projectile and wherein the first length is equal to a standard length for the first caliber projectile;
   a jacket covering an outer surface of the undersized core and made from polymer, wherein the jacket forms a second outer diameter and a second outer length, wherein the second outer diameter is equal to a standard diameter for a second caliber projectile and wherein the second outer length is equal to a standard length for the second caliber projectile; and
   wherein the jacket has a nonuniformed outer surface and wherein the polymer jacketed projectile has a weight less than a standard weight of the second caliber projectile.

2. The polymer-jacketed projectile of claim 1, wherein the nonuniformed outer surface is formed by a plurality of dimples defined in the outer surface.

3. The polymer-jacketed projectile of claim 2, wherein the dimples have a semi-circular shape.

4. The polymer-jacketed projectile of claim 2, wherein the dimples have a hexagonal shape.

5. The polymer-jacketed projectile of claim 2, wherein the dimples have a pentagonal shape.

6. The polymer-jacketed projectile of claim 1, wherein the undersized core is formed from one or more metal powders.

7. The polymer-jacketed projectile of claim 6, wherein the metal powder is a high density tungsten metal powder.

8. The polymer-jacketed projectile of claim 6, wherein the metal powder further comprises one or more fillers.

9. The polymer-jacketed projectile of claim 8, wherein the filler is an aluminum filler material.

10. The polymer-jacketed projectile of claim 1, wherein the first caliber projectile is a 7 mm caliber projectile and wherein the second caliber projectile is a .308 caliber projectile.

11. The polymer-jacketed projectile of claim 1, wherein the undersized core has a first end defining an ogive region and a second opposite end with a boat tail.

12. The polymer-jacketed projectile of claim 11, wherein the jacket has an ogive region corresponding to the ogive region of the undersized core and a boat tail corresponding to the boat tail of the undersized core.

13. The polymer-jacketed projectile of claim 1, wherein the jacket forms a hollow point at a tip-end of the projectile.

14. The polymer-jacketed projectile of claim 1, wherein the jacket forms a rounded nose at a tip-end of the projectile.

15. The polymer-jacketed projectile of claim 1, wherein the projectile comprises a pellet.

16. The polymer-jacketed projectile of claim 1, wherein the projectile comprises a ball.

17. A method for manufacturing a polymer-jacketed projectile, comprising:
    preforming an undersized core from one or more metal powders by metal injection molding, wherein the undersized core has a first diameter and a first length which are equal to a standard diameter and standard length for a first caliber projectile; and
    molding a jacket, composed of one or more polymers, over the undersized core to form a polymer jacket with a nonuniformed outer surface, wherein the polymer jacket has a second diameter and a second length which are equal to a standard diameter and a standard length for a second caliber projectile, wherein the polymer-jacketed projectile has a weight that is less than a standard weight of the second caliber projectile.

18. The method of claim 17, wherein the preforming step further comprises placing the undersized core in a first die to form a boat tail.

19. The method of claim 17, wherein the preforming step further comprises placing the undersized core in a second die to form an ogive region.

20. The method of claim 17, wherein the nonuniformed outer surface of the molded jacket comprises a plurality of dimples each having a semi-circular shape.

* * * * *